United States Patent
Tabeta et al.

(10) Patent No.: US 10,392,784 B2
(45) Date of Patent: Aug. 27, 2019

(54) SMALL-SIZED CONSTRUCTION MACHINE

(71) Applicant: Hitachi Construction Machinery Tierra Co., Ltd., Koka-shi, Shiga (JP)

(72) Inventors: Hiroshi Tabeta, Konan (JP); Junya Kawamoto, Moriyama (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 0 days.

(21) Appl. No.: 15/758,875

(22) PCT Filed: Mar. 7, 2016

(86) PCT No.: PCT/JP2016/056971
§ 371 (c)(1),
(2) Date: Mar. 9, 2018

(87) PCT Pub. No.: WO2017/047130
PCT Pub. Date: Mar. 23, 2017

(65) Prior Publication Data
US 2018/0291590 A1    Oct. 11, 2018

(30) Foreign Application Priority Data

Sep. 16, 2015  (JP) .................................. 2015-182892

(51) Int. Cl.
*E02F 9/26* (2006.01)
*B60K 15/063* (2006.01)
(Continued)

(52) U.S. Cl.
CPC .............. *E02F 9/26* (2013.01); *B60K 15/063* (2013.01); *E02F 3/325* (2013.01); *E02F 9/00* (2013.01);
(Continued)

(58) Field of Classification Search
CPC .... G01F 23/02; E02F 9/00; E02F 9/26; E02F 9/0816; E02F 9/0083; E02F 3/325; B60K 15/063
See application file for complete search history.

(56) References Cited

U.S. PATENT DOCUMENTS 4,590,798 A * 5/1986 Yazaki ................... F01M 11/12
116/227

FOREIGN PATENT DOCUMENTS

JP        4-117152 U    10/1992
JP         5-3932 U     1/1993
(Continued)

OTHER PUBLICATIONS

Japanese-language International Search Report (PCT/ISA/210) issued in PCT Application No. PCT/JP2016/056971 with English translation dated Apr. 26, 2016 (four (4) pages).
(Continued)

*Primary Examiner* — Ronald P Jarrett
(74) *Attorney, Agent, or Firm* — Crowell & Moring LLP

(57) ABSTRACT

An upper revolving structure (4) includes a revolving frame (6), an engine (7), a fuel tank (11), an operator's seat platform (16) provided by covering an upper side of the fuel tank (11), an operator's seat (18) mounted on the operator's seat platform (16), and a cab (22) covering a periphery of the operator's seat (18). The fuel tank (11) is disposed between the revolving frame (6) and the operator's seat platform (16), brought closer to a left surface part (25) side of the cab (22). A level gauge (29) is provided on an outer surface of the fuel tank (11). A fuel filling opening (27) surrounding a fuel filling port (11J) of the fuel tank (11) and a level gauge opening (28) are provided on the left surface part (25) of the cab (22).

3 Claims, 13 Drawing Sheets

(51) Int. Cl.
*E02F 9/00* (2006.01)
*E02F 9/16* (2006.01)
*G01F 23/02* (2006.01)
*E02F 3/32* (2006.01)
*E02F 9/08* (2006.01)

(52) U.S. Cl.
CPC .............. *E02F 9/0883* (2013.01); *E02F 9/16* (2013.01); *G01F 23/02* (2013.01)

(56) References Cited

FOREIGN PATENT DOCUMENTS

| | | | |
|---|---|---|---|
| JP | 2002-103995 A | 4/2002 | |
| JP | 2002-234351 A | 8/2002 | |
| JP | 2003-211983 A | 7/2003 | |
| JP | 2003211983 | * 7/2003 | ............. G01F 23/02 |
| JP | 2003-336286 A | 11/2003 | |
| JP | 2006-321294 A | 11/2006 | |

OTHER PUBLICATIONS

Japanese-language Written Opinion (PCT/ISA/237) issued in PCT Application No. PCT/JP2016/056971 dated Apr. 26, 2016, 2016 (four (4) pages).
Korean-language Office Action issued in counterpart Korean Application No. 1020187006482 dated Dec. 27, 2018 (four (4) pages).
European Search Report issued in European counterpart application No. 16846003.8-1018 / 3351909 dated May 8, 2019 (Seven (7) pages).

* cited by examiner

SMALL-SIZED CONSTRUCTION MACHINE

TECHNICAL FIELD

The present invention relates to a construction machine such as a hydraulic excavator or the like, for example, and particularly to a small-sized construction machine including a level gauge for checking an oil amount in a fuel tank.

BACKGROUND ART

A hydraulic excavator which is s typical example of a construction machine is constituted by a self-propelled lower traveling structure, an upper revolving structure rotatably mounted on the lower traveling structure, and a working mechanism provided on a front side of the upper revolving structure, capable of moving upward/downward. Moreover, the upper revolving structure has a revolving frame forming a support structural body, and a prime mover, a hydraulic pump, a heat exchanger, a fuel tank and the like are mounted on this revolving frame.

Here, in order to check an oil amount (liquid level) of a fuel stored in the fuel tank, provision of a level gauge in the fuel tank is known (see Patent Document 1). In this case, an exterior cover covering the fuel tank is provided on the hydraulic excavator. An opening portion (inspecting window) for visually checking the level gauge from outside the exterior cover is formed at a portion corresponding to the level gauge of the fuel tank in the exterior cover. As a result, a worker can check the oil amount in the fuel tank by visually checking the level gauge through the opening portion from outside the exterior cover.

PRIOR ART DOCUMENT

Patent Document

Patent Document 1: Japanese Patent Laid-Open No. 2006-321294 A

SUMMARY OF THE INVENTION

Incidentally, the hydraulic excavator according to the aforementioned prior art is a medium-sized hydraulic excavator in which a fuel tank is disposed between a cab covering an operator's seat and an engine. This medium-sized hydraulic excavator can ensure a large space for disposing an onboard device on the revolving frame.

On the other hand, in a small-sized hydraulic excavator called a mini-shovel, a machine weight is kept to approximately 1 to 8 tons, for example, since it is used for a disassembling work inside a building, an excavating work in a small place on a street or the like. Therefore, the small-sized hydraulic excavator has a small upper revolving structure and a small space for disposing the onboard device on the revolving frame. Thus, in the small-sized hydraulic excavator, an engine, a hydraulic pump, a heat exchanger, a fuel tank and the like need to be disposed in a small space on the revolving frame in a state close to each other.

On the other hand, in order to ensure long operating time, there is a demand for disposition of a fuel tank with as large capacity as possible in a small space. As described above, when the fuel tank with the large capacity is to be disposed in a small space, the disposition of the fuel tank is limited by the other onboard devices. As a result, there is a problem that to check the oil amount in the fuel tank by the level gauge from outside is difficult.

The present invention was made in view of the aforementioned prior-art problems and has an object to provide a small-sized construction machine which enables check of the oil amount in the fuel tank by the level gauge from outside when the fuel tank is disposed in a small space on the revolving frame.

In order to solve the aforementioned problems, the present invention is applied to a small-sized construction machine comprising: a self-propelled lower traveling structure, an upper revolving structure rotatably mounted on the lower traveling structure, and a working mechanism provided on a front part side of the upper revolving structure, wherein the upper revolving structure including: a revolving frame forming a support structural body, a prime mover mounted on the revolving frame, a fuel tank having a fuel filling port supplying a fuel to an outer surface and storing the fuel to be supplied to the prime mover, an operator's seat platform provided on the revolving frame by covering an upper side of the fuel tank and on which the operator's seat is mounted, and a cab made of a box body covering a periphery of the operator's seat mounted on the operator's seat platform.

And a feature of the constitution adopted for the present invention is that the fuel tank is disposed between the revolving frame and the operator's seat platform, brought closer to an outer surface side of the cab; a level gauge displaying a liquid level in the fuel tank is provided on the outer surface of the fuel tank; and a fuel filling opening surrounding the fuel filling port of the fuel tank is provided on the outer surface of the cab and a level gauge opening for visually checking the level gauge from outside of the cab is provided.

According to the present invention, if the space on the revolving frame is small and an operator's seat is disposed on an upper side of the fuel tank, by providing an opening for level gauge on the outer surface of the cab covering the operator's seat, the level gauge of the fuel tank can be visually checked through this opening for level gauge. As a result, when the fuel tank is disposed in the small space on the revolving frame, the oil amount in this fuel tank can be easily checked by the level gauge from outside the cab.

BRIEF DESCRIPTION OF THE DRAWINGS

FIG. 11 is a perspective view showing a fuel filling opening in the cab, a level gauge opening, a side surface cover and the like.

MODE FOR CARRYING OUT THE INVENTION

Hereinafter, a small-sized hydraulic excavator as a typical example of a small-sized construction machine according to an embodiment of the present invention will be explained in detail referring to FIGS. 1 to 15.

Figure 1:
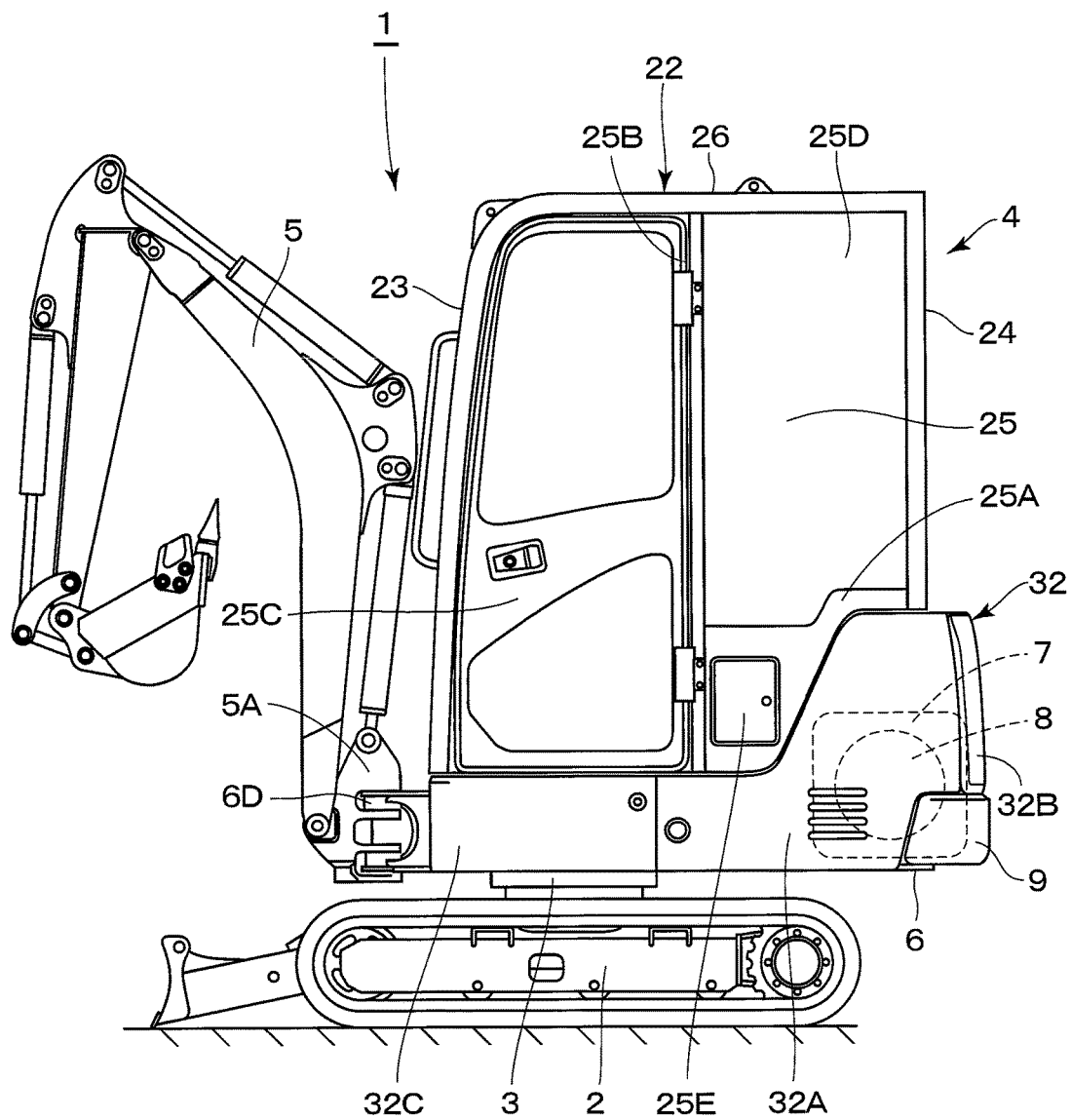
FIG. 1 is a front view showing a small-sized hydraulic excavator according to an embodiment of the present invention.

In FIG. 1, a small-sized hydraulic excavator 1 which is a typical example of a small-sized construction machine includes a self-propelled crawler-type lower traveling structure 2 and an upper revolving structure 4 rotatably mounted on the lower traveling structure 2 through a revolving device 3. A swing-type working mechanism 5 capable of swing in a left-and-right direction is provided on a front side of the upper revolving structure 4, and an excavating work of earth and sand or the like is performed by using this working mechanism 5. Here, the small-sized hydraulic excavator 1 is used in a disassembling work inside a building, an excavating work in a narrow space such as a narrow street and thus, a machine weight is kept to approximately 1 to 8 tons, for example.

Figure 2:
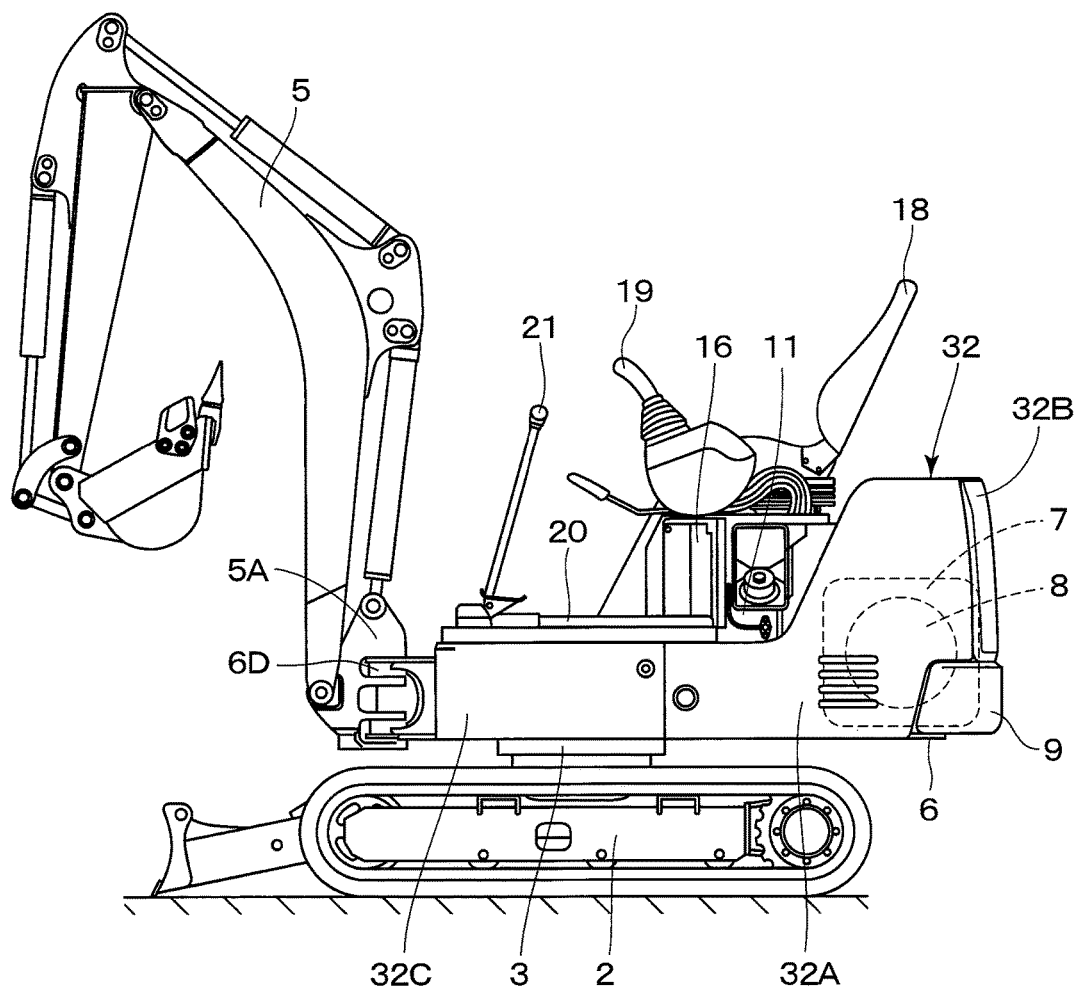
FIG. 2 is a front view showing the hydraulic excavator with a cab removed.
Figure 3:
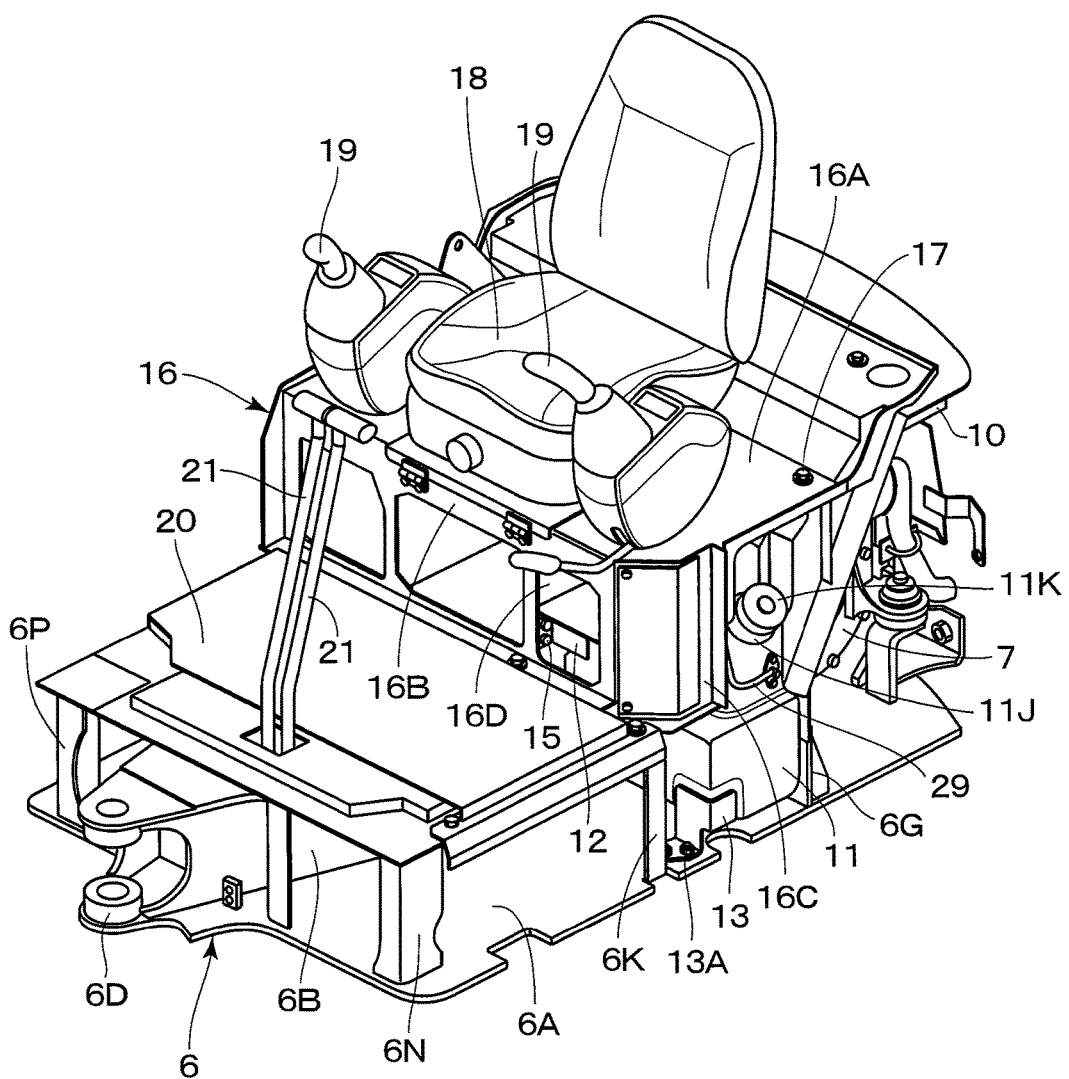
FIG. 3 is a perspective view showing a state where the cab and the exterior cover are removed from an upper revolving structure of the hydraulic excavator.

As shown in FIGS. 2 and 3, the upper revolving structure 4 is constituted by including a revolving frame 6 which will be described later, an engine 7, a counterweight 9, a support member 10, a fuel tank 11, an operator's seat platform 16, an operator's seat 18, a cab 22, and an exterior cover 32. Here, since the small-sized hydraulic excavator 1 is applied to a small work site such as an inside of a building, a street or the like, for example, the upper revolving structure 4 is formed small. Thus, in the hydraulic excavator 1, a space for disposing various onboard devices on the revolving frame 6 is small, and the operator's seat 18 is disposed on an upper side of the fuel tank 11.

Figure 4:
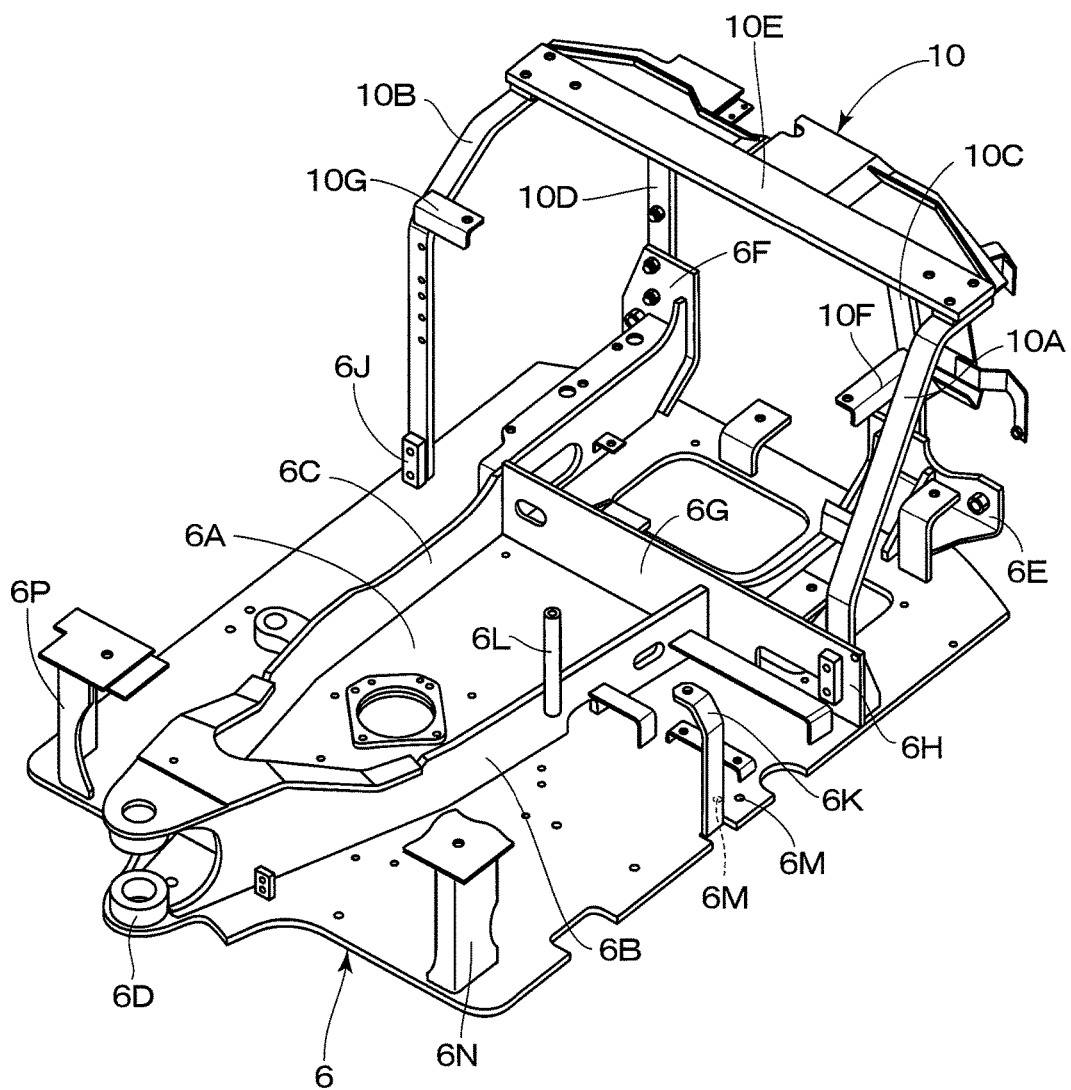
FIG. 4 is a perspective view showing the revolving frame as a single body.

The revolving frame 6 is rotatably provided on the lower traveling structure 2 through the revolving device 3. The revolving frame 6 forms a support structural body and constitutes a base for the upper revolving structure 4. As shown in FIG. 4, the revolving frame 6 is constituted by including a bottom plate 6A formed using a thick steel plate or the like and having a rectangular shape extending in a front-and-rear direction and a left vertical plate 6B and a right vertical plate 6C provided upright on the bottom plate 6A so as to extend in the front-and-rear direction.

A support bracket 6D is provided on front end portions of the left and right vertical plates 6B and 6C. The support bracket 6D supports a swing post 5A provided on a base end of the working mechanism 5, capable of swing in the left-and-right direction. Left and right rear brackets 6E and 6F are provided on rear end parts of the left and right vertical plates 6B and 6C. On these Left and right rear brackets 6E and 6F, left and right rear leg portions 10C and 10D of the support member 10 which will be described later are mounted. A lateral plate 6G crossing a middle part of the left vertical plate 6B in the front-and-rear direction and extending in the left-and-right direction is provided upright on a middle part of the bottom plate 6A in the front-and-rear direction. The lateral plate 6G extends from the right vertical plate 6C beyond the left vertical plate 6B up to a left end edge portion of the bottom plate 6A.

A left end portion of the lateral plate 6G becomes a left front bracket 6H, and on this left front bracket 6H, a left front leg portion 10A of the support member 10 is mounted. A right front bracket 6J rising upward from the bottom plate 6A is provided on a right end portion located on an extension of the lateral plate 6G in the bottom plate 6A. On this right front bracket 6J, a right front leg portion 10B of the support member 10 is mounted.

A left front platform support member 6K is provided on a left end portion of the bottom plate 6A and on a middle part in the front-and-rear direction. This left front platform support member 6K is made of a plate body bent having an inverted L-shape and extends upward from the bottom plate 6A. A right front platform support member 6L is provided on a portion faced with the left front platform support member 6K in the left-and-right direction on an outer surface of the left vertical plate 6B. This right front platform support member 6L is constituted by a rod-shaped body extending in an up-and-down direction. These left and right front platform support members 6K and 6L support a front side of the operator's seat platform 16 which will be described later.

Two bolt through holes 6M are provided on the left end portion of the bottom plate 6A and in the vicinity portion of the left front platform support member 6K by penetrating in the up-and-down direction. A tank mounting bolt 14 which will be described later is inserted into each of these bolt through holes 6M. Moreover, a left front cab support plate 6N is provided upright at a corner part on the left front side of the bottom plate 6A. The left front cab support plate 6N is to support a left front side of the cab 22 which will be described later. A right front cab support plate 6P is provided upright at a corner part on the right front side of the bottom plate 6A. The right front cab support plate 6P is to support a right front side of the cab 22.

The engine 7 as a prime mover is mounted closer to a rear side than the lateral plate 6G of the revolving frame 6. The engine 7 is disposed on the revolving frame 6 in a laterally placed state with a crank shaft (not shown) extending in the left-and-right direction. As shown in FIGS. 1 and 2, a hydraulic pump 8 is provided on a left side of the engine 7. The hydraulic pump 8 supplies a pressurized oil toward various hydraulic actuators mounted on the hydraulic excavator 1 by being driven by the engine 7. On the other hand, heat exchangers such as a radiator, an oil cooler and the like (none of them is shown) are disposed on a right side of the engine 7.

The counterweight 9 is provided on a rear end of the revolving frame 6. The counterweight 9 is to take a weight balance with the working mechanism 5 and is formed as an arc-shaped heavy article with a center part in the left-and-right direction protruding rearward.

The support member 10 is disposed closer to the rear side than the lateral plate 6G of the revolving frame 6 and is mounted on the revolving frame 6 so as to be provided across the engine 7. The support member 10 has the operator's seat platform 16 which will be described later mounted and is to support the rear side of the cab 22. Here, the support member 10 is constituted by including the left front leg portion 10A, the right front leg portion 10B, the left rear leg portion 10C, the right rear leg portion 10D, and a supporting base 10E mounted on an upper end of each of these leg portions 10A, 10B, 10C, and 10D.

A lower end of the left front leg portion 10A is fastened by a bolt to the left front bracket 6H of the revolving frame 6, and an upper end of the left front leg portion 10A is diagonally inclined rearward. A lower end of the right front leg portion 10B is fastened by a bolt to the right front bracket 6J of the revolving frame 6, and an upper end of the right front leg portion 10B is diagonally inclined rearward. On the other hand, a lower end of the left rear leg portion 10C is fastened by a bolt to the left rear bracket 6E of the revolving frame 6, and an upper end of the left rear leg portion 10C extends upward. A lower end of the right rear leg portion 10D is fastened by a bolt to the right rear bracket 6F of the revolving frame 6, and an upper end of the right rear leg portion 10D extends upward.

The supporting base 10E is fixed to the upper ends of the left and right front leg portions 10A and 10B and the upper ends of the left and right rear leg portions 10C and 10D. The supporting base 10E has a width dimension substantially equal to a width dimension in the left-and-right direction of the revolving frame 6 and extends in the left-and-right direction in a state where the upper ends of the leg portions 10A, 10B, 10C, and 10D are connected to each other.

The left rear platform support member 10F is provided on the upper side of the left front leg portion 10A. The left rear platform support member 10F is formed by using an angle steel or the like and protrudes forward from the left front leg portion 10A. The right rear platform support member 10G is provided on the middle part in the up-and-down direction of the right front leg portion 10B. The right rear platform support member 10G is formed by using an angle steel or the like and protrudes to the left from the right front leg portion 10B. These left and right rear platform support members 10F and 10G are to support the rear end side of the operator's seat platform 16.

Figure 5:
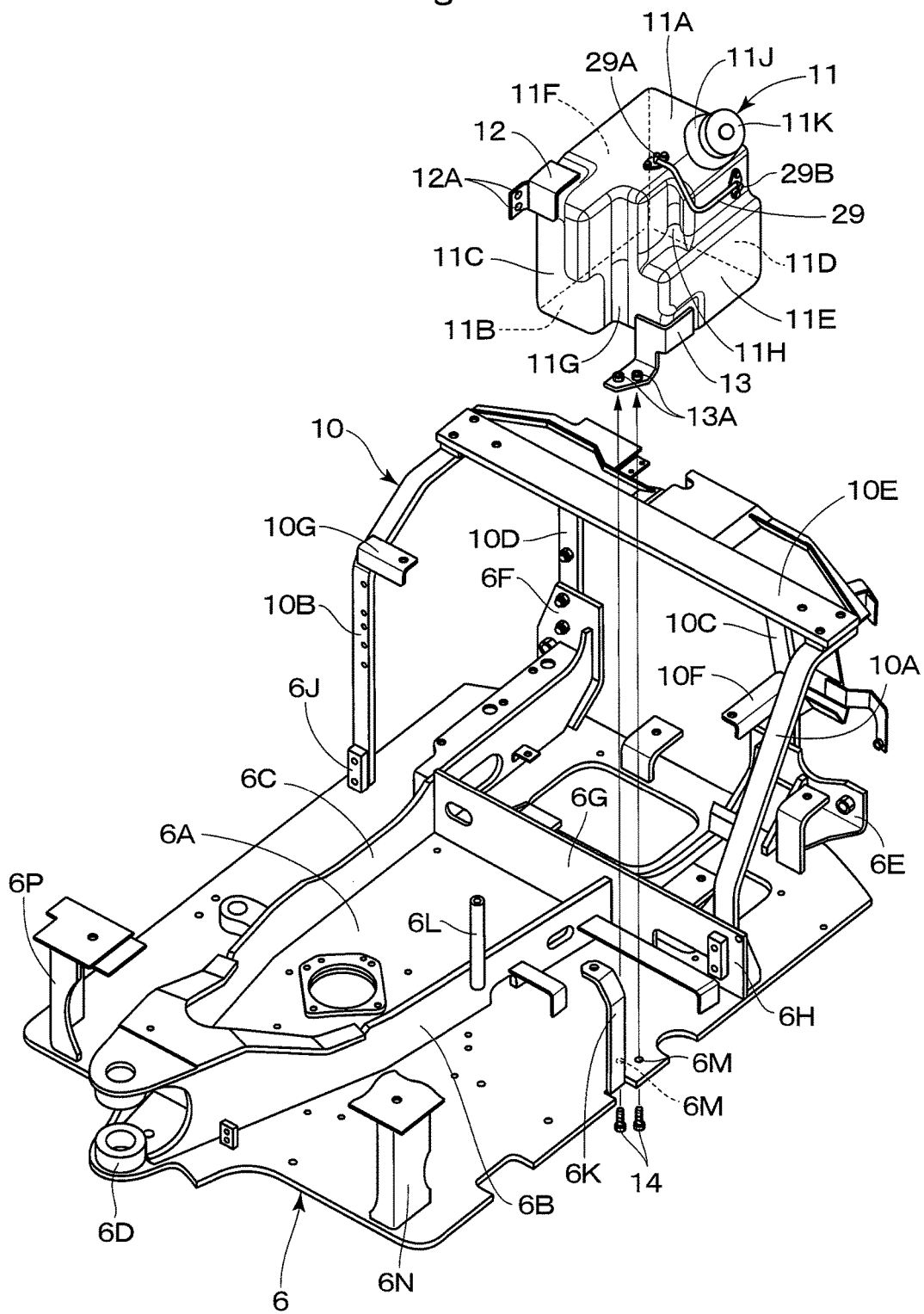
FIG. 5 is an exploded perspective view showing a state where a fuel tank is mounted on the revolving frame.

The fuel tank 11 is mounted on the bottom plate 6A by being located closer to the left side than the left vertical plate 6B of the revolving frame 6 and located closer to the front side than the lateral plate 6G. The fuel tank 11 is to store the fuel to be supplied to the engine 7. Here, as shown in FIG. 5 and the like, the fuel tank 11 is formed as a box-shaped body surrounded by an top surface 11A, a bottom surface 11B, a front surface 11C, a rear surface 11D, a left surface 11E, and a right surface 11F. A front surface recessed part 11G is formed at a corner part where the front surface 11C and the left surface 11E cross each other. A front surface recessed part 11G is dented toward the rear surface 11D side over the entire region in the up-and-down direction. Moreover, a side surface recessed part 11H is formed at a corner part where an upper-side portion of the left surface 11E and the front surface recessed part 11G cross each other. The side surface recessed part 11H is dented to the right surface 11F side. As described above, the fuel tank 11 is not an even cuboid body but is formed having a complicated three-dimensional shape having the front surface recessed part 11G, the side surface recessed part 11H and the like. As a result, the fuel tank 11 ensures as large capacity as possible while avoiding interference with various onboard devices mounted on the revolving frame 6.

A fuel filling port 11J is provided on an outer surface of a corner part where the top surface 11A, the rear surface 11D, and the left surface 11E of the fuel tank 11 cross each other. The fuel filling port 11J has a cylindrical shape and it is a port into which a fuel supply nozzle (not shown) is inserted when the fuel is supplied to the fuel tank 11. The fuel filling port 11J protrudes upward diagonally left from the outer surface of the fuel tank 11. A protruding end of the fuel filling port 11J is disposed in a fuel filling opening 27 which will be described later of the cab 22 (see FIG. 11). The fuel filling port 11J is capped by a cap 11K.

An upper-side tank bracket 12 is fixed to the outer surface of the corner part where the top surface 11A, the front surface 11C, and the right surface 11F of the fuel tank 11 cross each other. Two bolt through holes 12A are provided in the upper-side tank bracket 12. Each of these bolt through holes 12A corresponds to a tank mounting nut 16K of the operator's seat platform 16 which will be described later. A lower-side tank bracket 13 is fixed to an outer surface of a corner part where the bottom surface 11B, the left surface 11E, and the front surface recessed part 11G of the fuel tank 11 cross each other. Two welding nuts 13A are provided in the lower-side tank bracket 13. Each of these welding nuts 13A corresponds to the bolt through hole 6M of the revolving frame 6 (bottom plate 6A).

Figure 6:
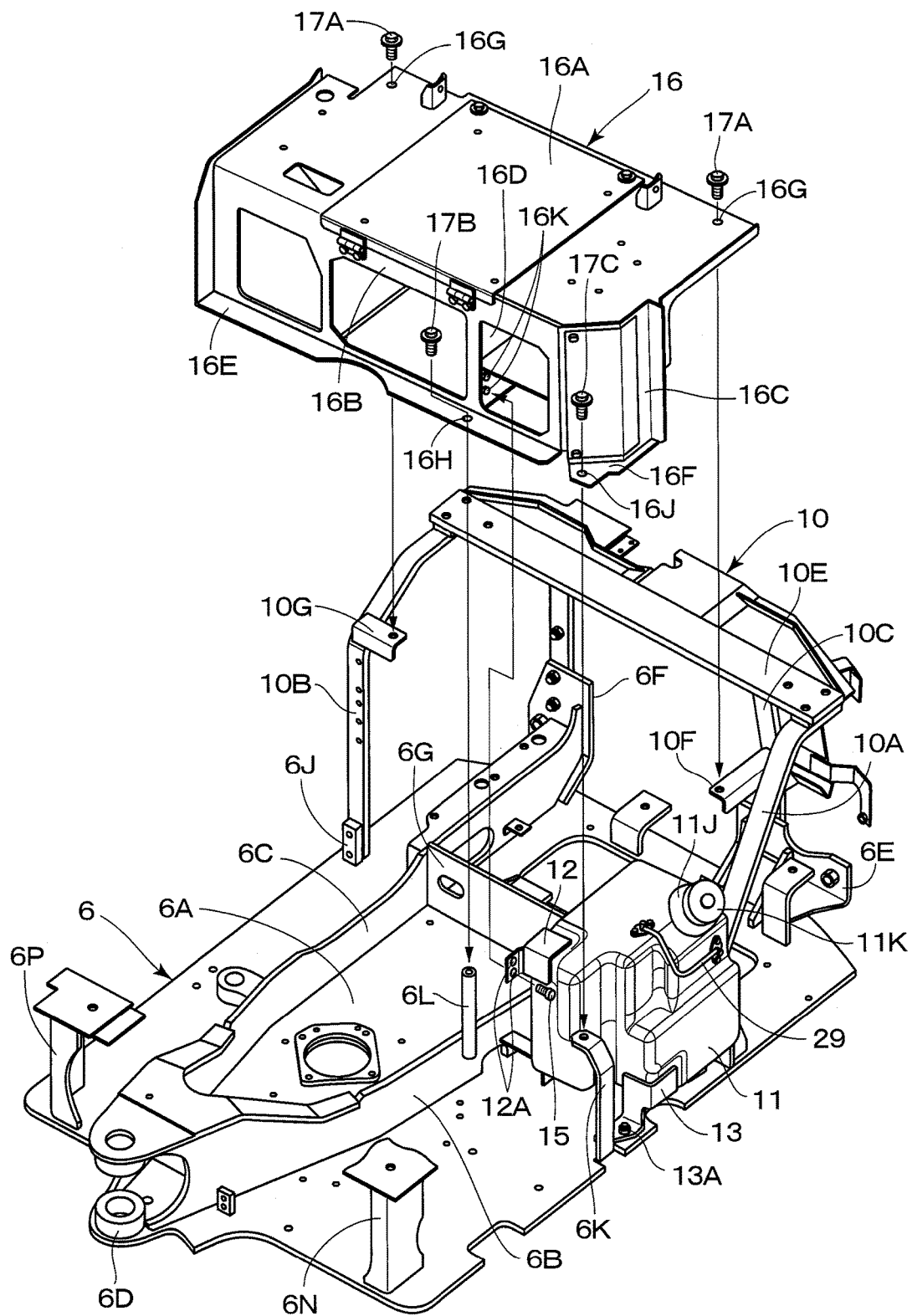
FIG. 6 is an exploded perspective view showing a state where an operator's seat platform is mounted on the revolving frame on which the fuel tank is mounted.

As shown in FIG. 5, the two tank mounting bolts 14 are inserted upward into the bolt through holes 6M in the revolving frame 6 and screwed with each of the welding nuts 13A of the lower-side tank bracket 13. As a result, the lower-side tank bracket 13 of the fuel tank 11 is fixed to the bottom plate 6A of the revolving frame 6. On the other hand, as shown in FIG. 6, the two tank mounting bolts 15 are inserted into the bolt through holes 12A of the upper-side tank bracket 12 and are screwed with the tank mounting nuts 16K of the operator's seat platform 16. As a result, the upper-side tank bracket 12 of the fuel tank 11 is fixed to the operator's seat platform 16.

As a result, the fuel tank 11 is located on the left side of the left vertical plate 6B of the revolving frame 6 and on the front side of the lateral plate 6G and is mounted on the bottom plate 6A. Therefore, the fuel tank 11 is disposed between the revolving frame 6 and the operator's seat platform 16, brought closer to the left surface part 25 side of the cab 22 which will be described later.

Figure 7:
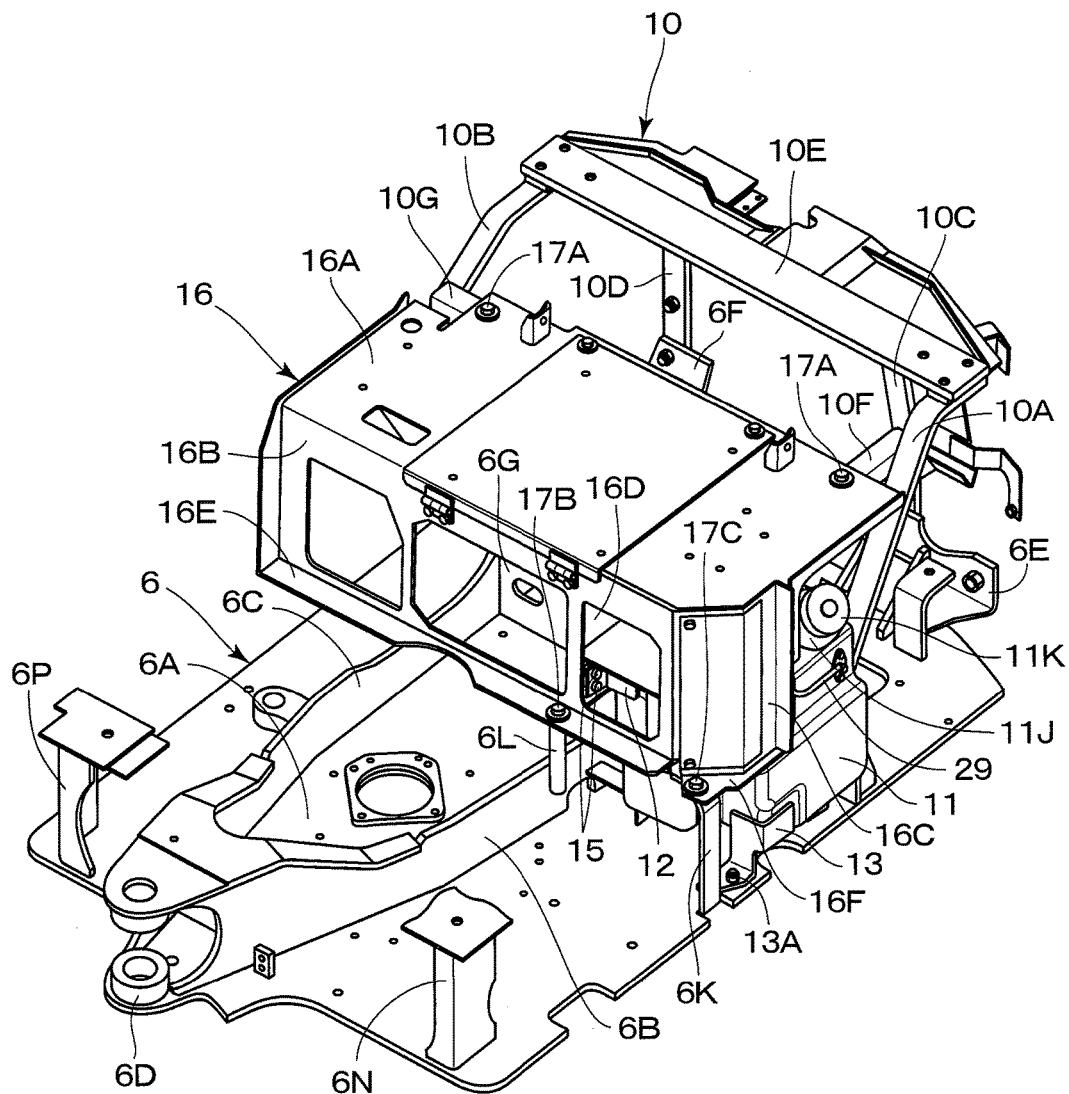
FIG. 7 is a perspective view showing a state where the fuel tank and the operator's seat platform are mounted on the revolving frame.
Figure 8:
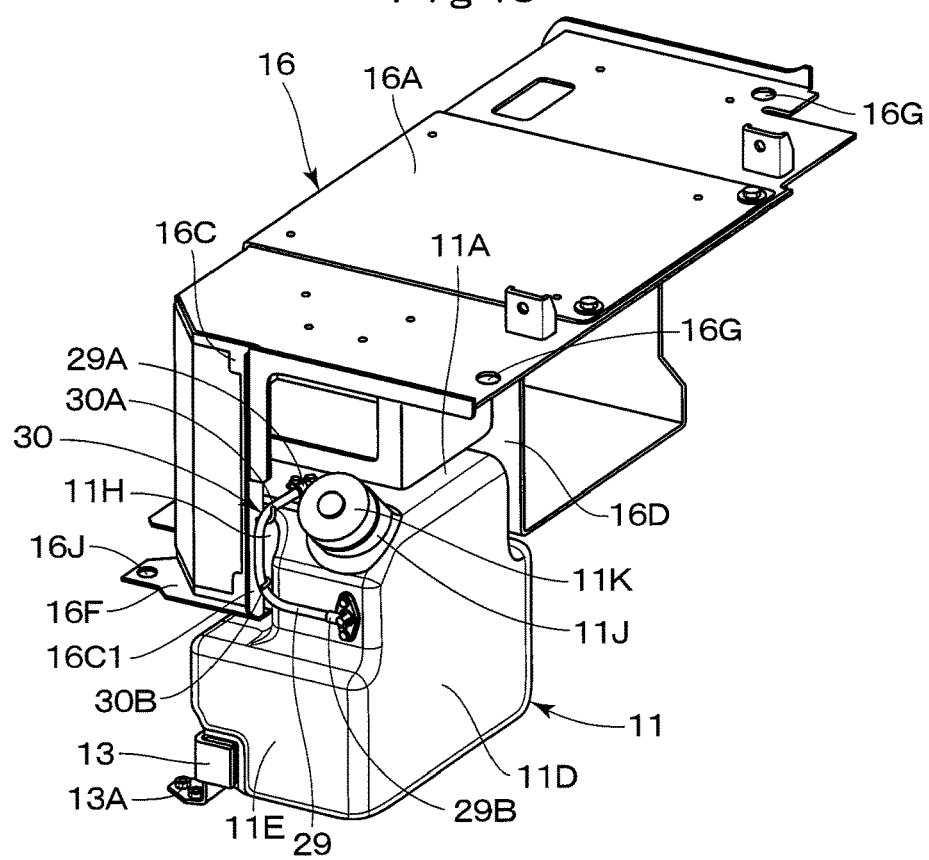
FIG. 8 is a perspective view showing a level gauge holder of the operator's seat platform and a level gauge of a fuel tank.

The operator's seat platform 16 is provided on the revolving frame 6 through the support member 10 in a state where the upper side of the fuel tank 11 is covered. As shown in FIGS. 6 to 8, the operator's seat platform 16 is constituted by including a rectangular top plate 16A, a front plate 16B, a left plate 16C, and a box-shaped partition plate 16D. The top plate 16A has a width dimension in the left-and-right direction substantially equal to the bottom plate 6A of the revolving frame 6. The front plate 16B is suspended downward from the front end side of the top plate 16A and extended in the left-and-right direction. The left plate 16C is extended rearward from the left end side of the front plate 16B and extended to a middle portion of the top plate 16A in the front-and-rear direction. The partition plate 16D is fixed to the lower surface of the top plate 16A in a state faced with the left plate 16C at an interval in the left-and-right direction. A front flange plate 16E expanding forward is provided on the lower end of the front plate 16B. A left front flange plate 16F expanding forward is provided on the lower end of the left plate 16C.

Two bolt through holes 16G are provided by being separated from each other in the left-and-right direction in the top plate 16A of the operator's seat platform 16. Each of the bolt through holes 16G is disposed at a position corresponding to the left rear platform support member 10F and the right rear platform support member 10G of the support member 10. On the other hand, one bolt through hole 16H is provided in the front flange plate 16E of the operator's seat platform 16. The bolt through hole 16H is disposed at a position corresponding to the right front platform support member 6L of the revolving frame 6. One bolt through hole 16J is provided on the left front flange plate 16F of the operator's seat platform 16. The bolt through hole 16J is disposed at a position corresponding to the left front platform support member 6K of the revolving frame 6. Moreover, the two tank mounting nuts 16K are provided in the vicinity of the front plate 16B in the partition plate 16D of the operator's seat platform 16. Each of these tank mounting nuts 16K is disposed at a position corresponding to each of the bolt through holes 12A of the upper-side tank bracket 12 provided on the fuel tank 11 (see FIG. 6).

Then, two platform mounting bolts 17A are inserted into each of the bolt through holes 16G of the top plate 16A, respectively, and are screwed with the left rear platform support member 10F and the right rear platform support member 10G of the support member 10. Moreover, the platform mounting bolt 17B is inserted into the bolt through hole 16H of the front flange plate 16E and is screwed with the right front platform support member 6L of the revolving frame 6. The platform mounting bolt 17C is inserted into the bolt through hole 16J of the left front flange plate 16F and is screwed with the left front platform support member 6K of the revolving frame 6. As a result, the operator's seat platform 16 is mounted on the revolving frame 6 through the support member 10.

Figure 9:
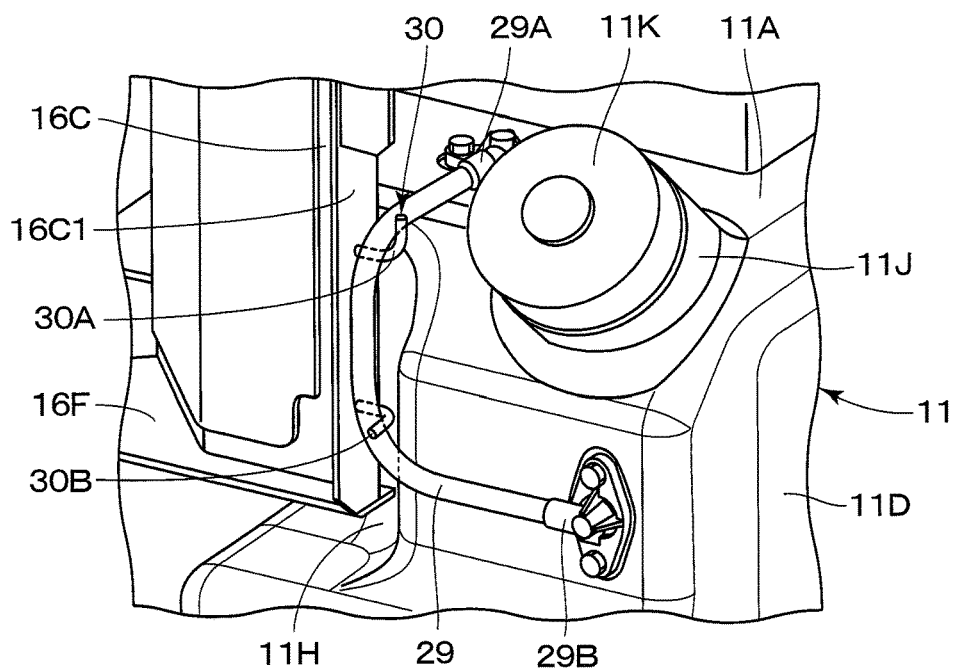
FIG. 9 is an enlarged view of an essential part showing the level gauge holder and the level gauge in FIG. 8 in an enlarged manner.

At this time, the two tank mounting bolts 15 are inserted into each of the bolt through holes 12A of the upper-side tank bracket 12 provided on the fuel tank 11, and each of the tank mounting bolts 15 is further screwed with each of the tank mounting nuts 16K of the operator's seat platform 16. As a result, the fuel tank 11 is mounted on the revolving frame 6 through the lower-side tank bracket 13 and is mounted on the operator's seat platform 16 through the upper-side tank bracket 12. As shown in FIGS. 8 and 9, a rear end part 16C1 of the left plate 16C constituting the operator's seat platform 16 is disposed in the vicinity of the side surface recessed part 11H of the fuel tank 11 in a state where the fuel tank 11 and the operator's seat platform 16 are mounted on the revolving frame 6. A level gauge holder 30 which will be described later is provided on the rear end part 16C1 of this left plate 16C.

As shown in FIGS. 2 and 3, the operator's seat 18 is mounted on the top plate 16A of the operator's seat platform 16 mounted on the revolving frame 6. The operator's seat 18 is for the operator who operates the small-sized hydraulic excavator 1 to be seated, and an operation device 19 for operating the revolving device 3, the working mechanism 5 and the like is disposed on both left and right sides of the operator's seat 18.

On the other hand, a floor member 20 is provided on a front side of the operator's seat platform 16. The floor member 20 is for forming a footing for the operator who gets onboard the small-sized hydraulic excavator 1. A space for accommodating the onboard devices (not shown) such as a control valve or the like is formed between the bottom plate 6A of the revolving frame 6 and the floor member 20. Moreover, left and right traveling lever pedals 21 are provided on the front side of the floor member 20. These left and right traveling lever pedals 21 are operated when a traveling operation of the lower traveling structure 2 is to be controlled.

Figure 10:
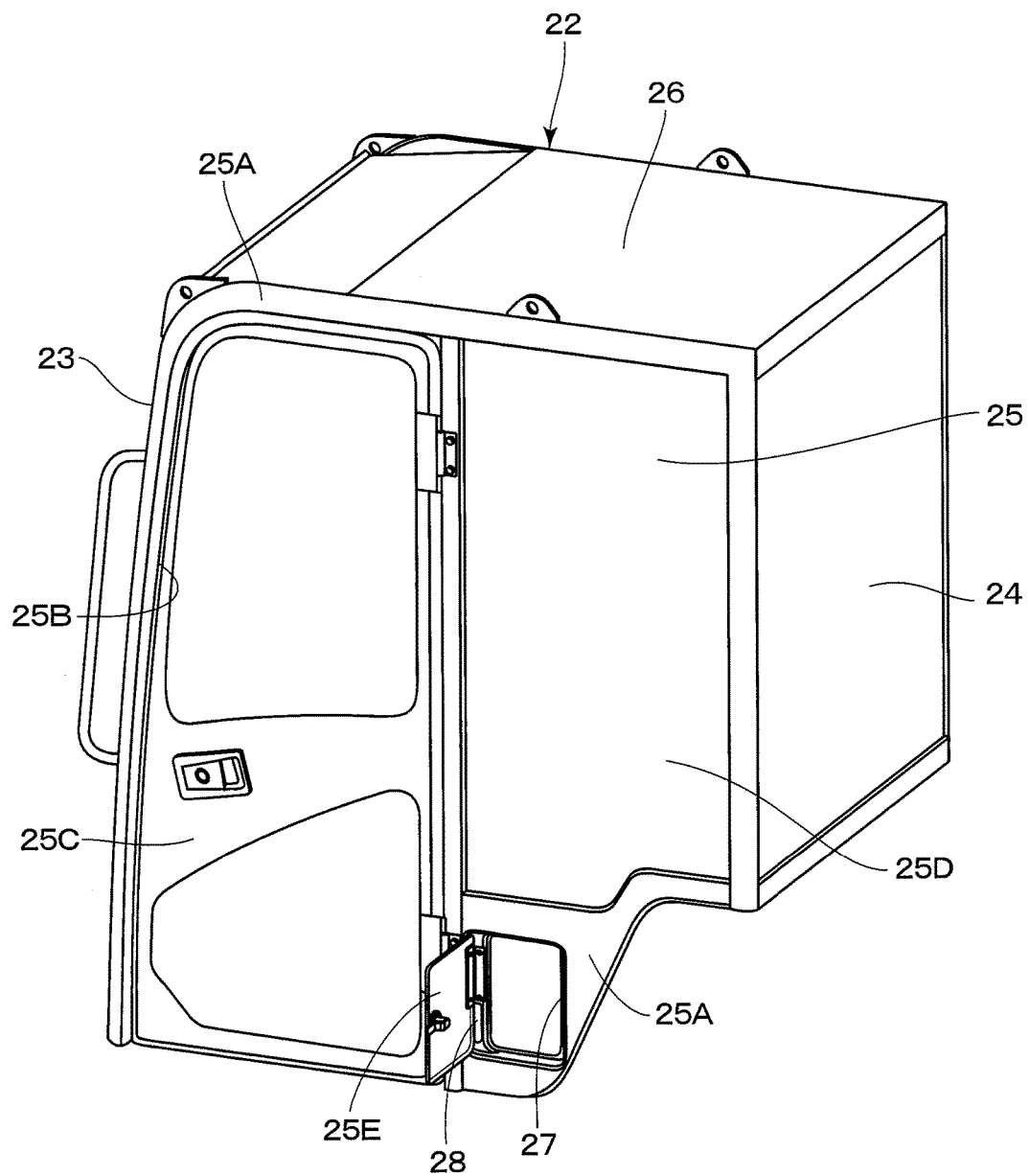
FIG. 10 is a perspective view showing the cab as a single body.

The cab 22 is formed as a box body surrounding a periphery of the operator's seat 18 and defines the operator's chamber. As shown in FIG. 10, the cab 22 is formed having a box shape surrounded by a front surface part 23, a rear surface part 24 faced with the front surface part 23 in the front-and-rear direction, a left surface part 25, a right surface part (not shown), and a top surface part 26. The left surface part 25 and the right surface part are faced in the left-and-right direction by sandwiching the front surface part 23 and the rear surface part 24 between them. The top surface part 26 closes upper ends of the front surface part 23, the rear surface part 24, the left surface part 25, and the right surface part.

The left surface part 25 of the cab 22 is constituted by a left surface panel 25A, an entrance way 25B provided on a front side of the left surface panel 25A, a door 25C with window for opening/closing the entrance way 25B, and a left rear window 25D located on a rear side of the door 25C. It is constituted such that the operator gets on/off the cab 22 through the entrance way 25B by opening the door 25C.

The cab 22 has its rear side supported by the supporting base 10E of the support member 10 and a front side supported by the left front cab support plate 6N and its right front cab support plate 6P of the revolving frame 6. As a result, the cab 22 is mounted on the revolving frame 6. Here, the cab 22 accommodates the operator's seat 18, the operation device 19, the traveling lever pedals 21 and the like, and the fuel tank 11 is disposed between the operator's seat platform 16 and the left surface part 25 of the cab 22.

Figure 11:
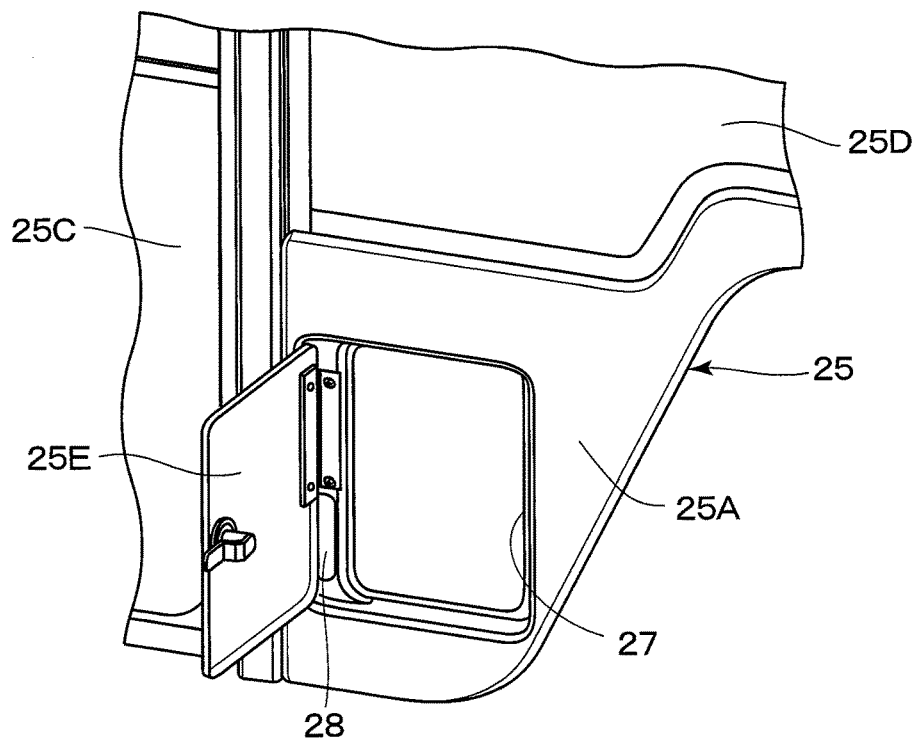

The fuel filling opening 27 is provided at a position corresponding to the fuel filling port 11J of the fuel tank 11 in the left surface part 25 of the cab 22. That is, as shown in FIGS. 10 and 11, the fuel filling opening 27 is formed as a rectangular hole at a position in the left surface panel 25A of the left surface part 25, on a rear side from the door 25C and a lower side from the left rear window 25D. Here, the fuel filling opening 27 of the left surface part 25 is disposed at a position surrounding the fuel filling port 11J of the fuel tank 11 in the state where the cab 22 is mounted on the revolving frame 6. As a result, the fuel filling port 11J of the fuel tank 11 can be exposed to an outside through the fuel filling opening 27. Therefore, a fuel filling work can be performed by inserting a fuel supply nozzle (not shown) from outside of the cab 22 into the fuel filling port 11J of the fuel tank 11.

A level gauge opening 28 is provided on the left surface part 25 of the cab 22, juxtaposed on the front side of the fuel filling opening 27. As shown in FIGS. 10 and 11, the level gauge opening 28 is formed by a long hole extending linearly in the up-and-down direction. A length dimension of the level gauge opening 28 in the up-and-down direction is set smaller than the fuel filling opening 27. This level gauge opening 28 is to visually check a level gauge 29 which will be described later, provided on the fuel tank 11, from outside of the cab 22. And the fuel filling opening 27 and the level gauge opening 28 are capped by a side surface cover 25E provided on the left surface part 25, capable of being opened/closed.

Subsequently, the level gauge 29 and the level gauge holder 30 used in this embodiment will be described.

The level gauge 29 is provided on the outer surface of the fuel tank 11 and to visually check the liquid level of the fuel stored in the fuel tank 11 from outside. This level gauge is formed by using a transparent tubular body having flexibility or a transparent plastic tube having oil resistance, for example. An top end part 29A of the level gauge 29 is connected to the top surface 11A of the fuel tank 11 and is opened into the fuel tank 11. On the other hand, a lower end part 29B of the level gauge 29 is connected to the left surface 11E by being located in the vicinity of a lower part of the fuel filling port 11J and is opened into the fuel tank 11. In this case, the level gauge 29 is extended in the up-and-down direction while being bent having an L-shape toward the lower end part 29B from the top end part 29A. As a result, the level gauge 29 is capable of visual check of the oil amount (liquid level) of the fuel stored in the fuel tank 11 from outside of the fuel tank 11.

As shown in FIGS. 8 and 9, the level gauge holder 30 is provided on the rear end part 16C1 of the left plate 16C constituting the operator's seat platform 16. The level gauge holder 30 is constituted by an upper holder 30A and a lower holder 30B disposed on upper and lower parts at an interval. The upper holder 30A and the lower holder 30B are formed by bending a rod material into an L-shape, respectively, and are fixed to the rear end part 16C1 of the left plate 16C by using means such as welding or the like, for example. The upper holder 30A protrudes upward from the rear end part 16C1 of the left plate 16C, while the lower holder 30B protrudes to a left side from the rear end part 16C1 of the left plate 16C. A middle portion of the level gauge 29 having flexibility is hooked by the upper holder 30A and the lower holder 30B. As a result, the level gauge 29 is held in a state extended linearly in the up-and-down direction between the upper holder 30A and the lower holder 30B. As a result, the level gauge 29 provided on the fuel tank 11 is held at a position corresponding to the level gauge opening 28 formed in the left surface part 25 of the cab 22 by the level gauge holder 30.

Figure 14:
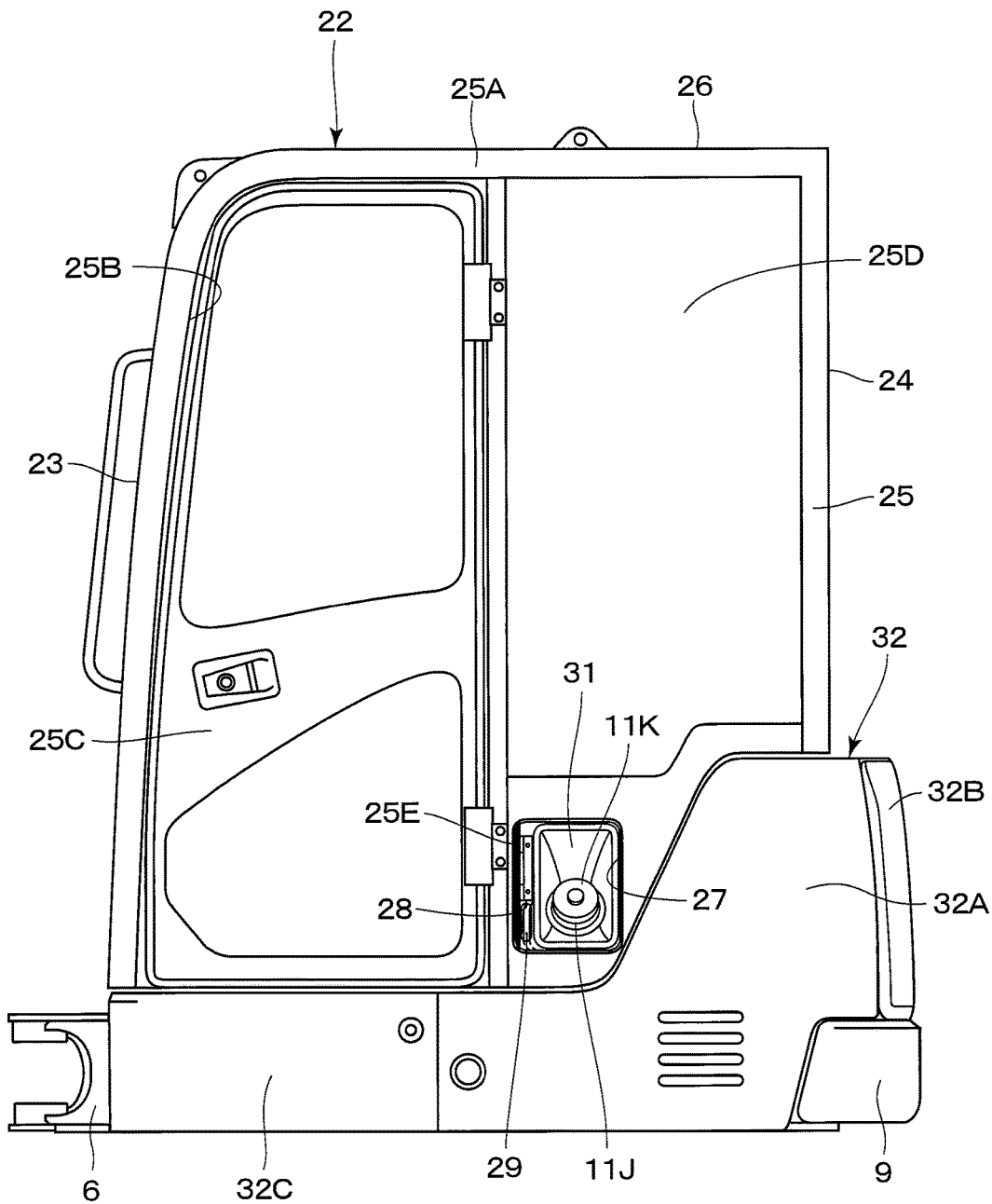
FIG. 14 is a front view of the upper revolving structure showing a state where the level gauge is visually checked from outside the cab through the level gauge opening.
Figure 15:
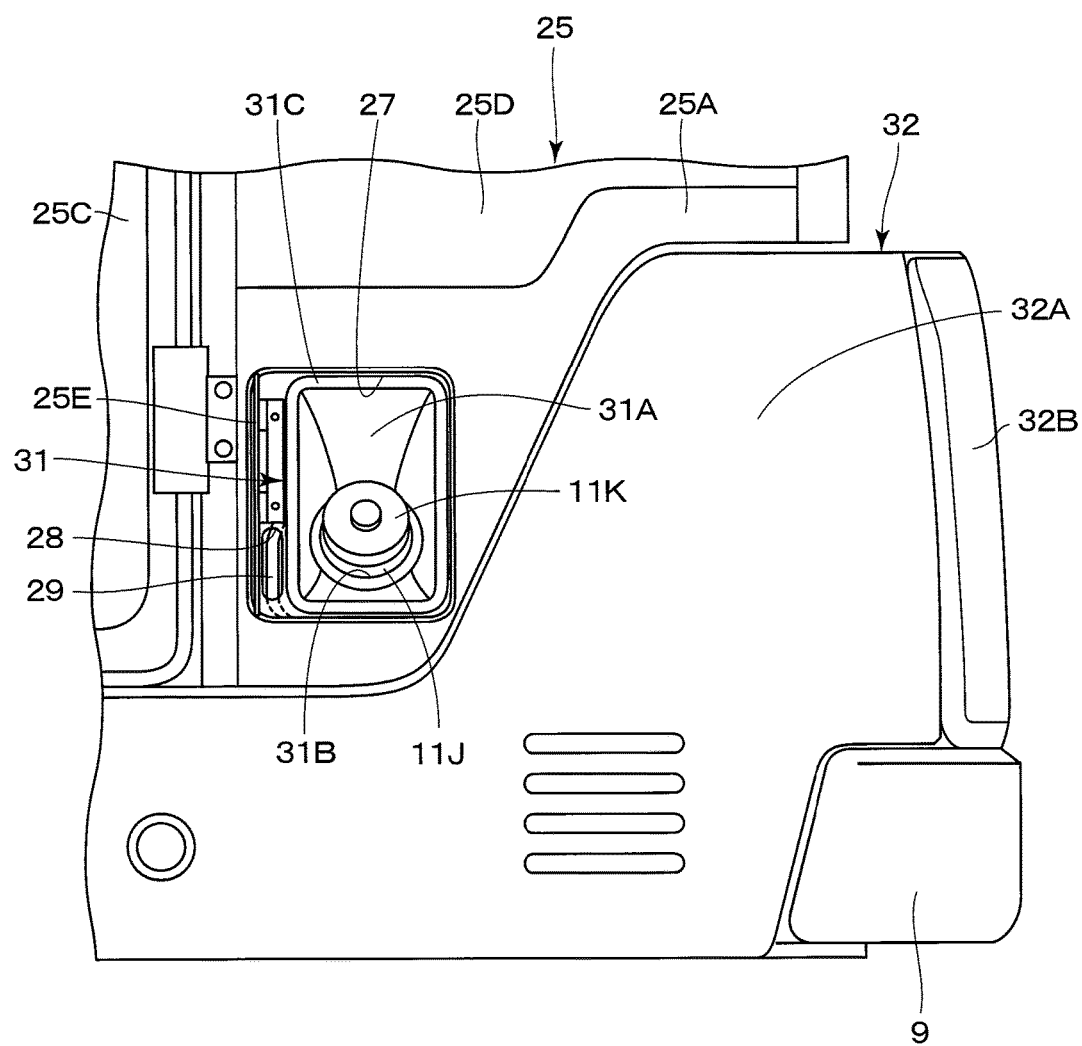
FIG. 15 is an enlarged view of an essential part showing the level gauge opening and the level gauge in FIG. 14 in an enlarged manner.

Therefore, as shown in FIGS. 14 and 15, the level gauge 29 enables visual check by opening the side surface cover 25E provided on the left surface part 25 of the cab 22. That is, the level gauge 29 enables visual check from outside of the cab 22 through the level gauge opening 28. As a result, the oil amount (fuel level) in the fuel tank 11 displayed by the level gauge 29 can be easily checked.

Figure 12:
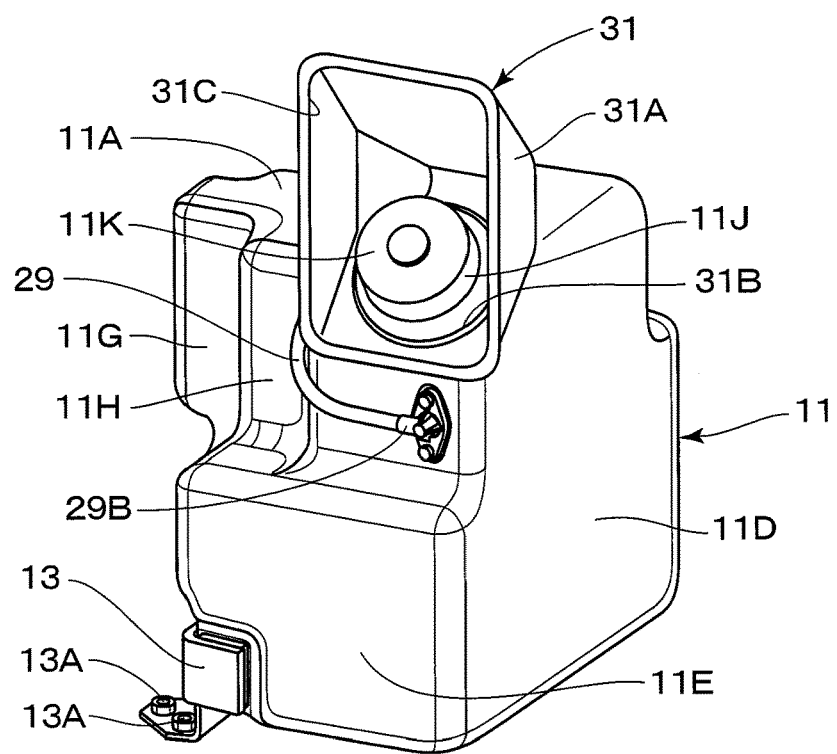
FIG. 12 is a perspective view showing a state where a scattering preventing cover is mounted on a fuel filling port of the fuel tank.
Figure 13:
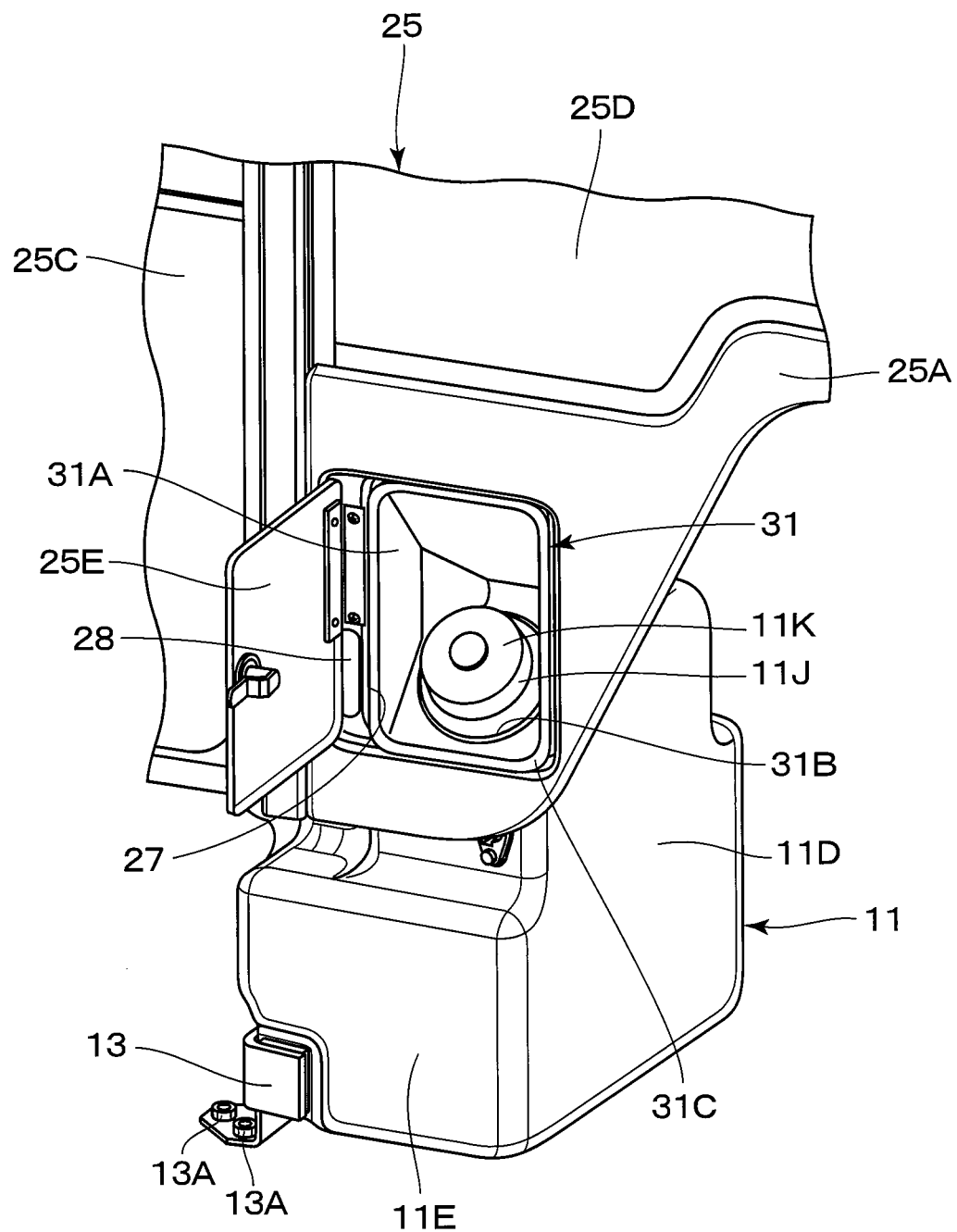
FIG. 13 is a perspective view showing a state where the scattering preventing cover is mounted between the fuel filling port of the fuel tank and the fuel filling opening in the cab.

A scattering preventing cover 31 is provided between the fuel filling port 11J of the fuel tank 11 and the fuel filling opening 27 of the cab 22. The scattering preventing cover 31 is, when the fuel is spilled from the fuel filling port 11J during the fuel filling work to the fuel tank 11, to suppress scattering of this spilled fuel to the periphery of the fuel tank 11. Here, as shown in FIGS. 12 and 13, the scattering preventing cover 31 is constituted by a pyramid-shaped cylindrical part 31A, a circular tank-side opening 31B, and a square cab-side opening 31C. The cylindrical part 31A is expanded from the fuel tank 11 toward the left surface part 25 of the cab 22. The tank-side opening 31B is opened to the fuel tank 11 side in the cylindrical part 31A and surrounds the fuel filling port of the fuel tank 11. The cab-side opening 31C is opened to a side opposite (the left surface part 25 side of the cab 22) to the tank-side opening 31B in the cylindrical part 31A and surrounds the fuel filling opening 27 of the cab 22.

Then, the tank-side opening 31B of the scattering preventing cover 31 is inserted/fitted in the fuel filling port 11J of the fuel tank 11, and the cab-side opening 31C is fitted over the entire circumference of an inner peripheral edge of the fuel filling opening 27. As a result, the scattering preventing cover 31 is provided between the fuel filling port of the fuel tank 11 and the fuel filling opening 27 of the cab 22 and shields the fuel filling port 11J of the fuel tank 11 from the inside of the cab 22.

The exterior cover 32 is provided on the lower side of the cab 22. The exterior cover 32 is constituted by including a left cover 32A and a right cover (not shown), an engine cover 32B, a left skirt cover 32C and a right skirt cover (not shown). The left cover 32A and the right cover are disposed on the rear side of the revolving frame 6 and cover the engine 7 and the like from the left-and-right direction. The engine cover 32B is disposed on the upper side of the counterweight 9 and covers the engine 7 and the like from the rear side. The left skirt cover 32C and the right skirt cover are disposed on the front side of the revolving frame 6 and cover the periphery of the floor member 20.

The small-sized hydraulic excavator 1 according to this embodiment has the constitution as above and subsequently, an operation of the hydraulic excavator 1 will be described.

The small-sized hydraulic excavator 1 having a machine weight of approximately 1 to 8 tons is transported to a work site in a state loaded on a bed of a truck. When the hydraulic excavator 1 has been transported to the work site, the operator opens the door 25C of the cab 22, gets on the cab 22 through the entrance way 25B and seats on the operator's seat 18. The operator seated on the operator's seat 18 operates the engine 7 and then, operates the left and right traveling lever pedals 21 disposed on the front side of the operator's seat 18. As a result, the hydraulic excavator 1 is self-propelled to a desired work site.

After the small-sized hydraulic excavator 1 has been self-propelled to the desired work site, the operator operates the operation device 19 provided on left and right of the operator's seat 18. As a result, the hydraulic excavator 1 can perform the disassembling work inside the building, a ditch excavating work in a narrow street or the like, an excavating work of earth and sand and the like by using the working mechanism 5, while the upper revolving structure 4 is revolved on the lower traveling structure 2.

On the other hand, when the oil amount of the fuel stored in the fuel tank 11 is to be checked, the operator stops the engine 7 and then, gets down on the ground from the cab 22 through the entrance way 25B. Subsequently, as shown in FIGS. 14 and 15, the operator opens the side surface cover 25E provided on the left surface part 25 of the cab 22.

As a result, the fuel filling opening 27 and the level gauge opening 28 formed on the left surface part 25 and the fuel filling port 11J of the fuel tank 11 can be exposed to the outside of the cab 22. At this time, the level gauge 29 provided on the fuel tank 11 is held at the position corresponding to the level gauge opening 28 by the level gauge holder 30 provided on the operator's seat platform 16. As a result, the operator can visually check the level gauge 29 through the level gauge opening 28 from the outside of the cab 22. And the operator can check the oil amount of the fuel stored in the fuel tank 11 by the fuel level displayed by the level gauge 29.

As described above, in the small-sized hydraulic excavator 1, the space on the revolving frame 6 is small, and the operator's seat 18 is disposed on the upper side of the fuel tank 11 through the operator's seat platform 16. However, the level gauge opening 28 is provided on the outer surface (left surface part 25) of the cab 22 covering the operator's seat 18. As a result, the level gauge 29 provided on the fuel tank 11 can be visually checked through the level gauge opening 28. As a result, even if the fuel tank 11 is disposed in the small space on the revolving frame 6, the oil amount in this fuel tank 11 can be easily checked by the level gauge 29 from the outside of the cab 22.

Then, if a sufficient fuel is stored in the fuel tank 11, the work to check the oil amount in the fuel tank 11 is finished by closing the side surface cover 25E so as to cap the fuel filling opening 27 and the level gauge opening 28.

On the other hand, if the fuel in the fuel tank 11 is not sufficient, the cap 11K is removed from the fuel filling port 11J of the fuel tank 11 disposed in the fuel filling opening 27. Then, the fuel supply nozzle (not shown) is inserted into the fuel filling port 11J, and the fuel is filled by using this fuel supply nozzle.

In this case, the scattering preventing cover 31 is provided between the fuel filling port 11J of the fuel tank 11 and the fuel filling opening 27. The tank-side opening 31B of the scattering preventing cover 31 is inserted/fitted in the fuel filling port 11J of the fuel tank 11. The cab-side opening 31C of the scattering preventing cover 31 is fitted over the entire circumference on the inner peripheral edge of the fuel filling opening 27. Therefore, the scattering preventing cover 31 shields the fuel filling port 11J of the fuel tank 11 from the inside of the cab 22. As a result, even if the fuel is spilled from the fuel filling port 11J during the fuel filling work to the fuel tank 11, this spilled fuel can be shielded by the scattering preventing cover 31 from the inside of the cab 22. As a result, adhesion of the spilled fuel to the engine 7 whose temperature has become high or scattering of the same into the cab 22 and causing an odor can be suppressed, and a work environment can be kept favorable.

Then, during the fuel filling work to the fuel tank 11, the level gauge 29 of the fuel tank 11 can be visually checked at all times through the level gauge opening 28 formed, juxtaposed on the front side of the fuel filling opening 27. As a result, the fuel filling work can be performed while the fuel level in the fuel tank 11 is checked, and workability of the fuel filling work can be improved.

Thus, in the small-sized hydraulic excavator 1 according to this embodiment, the fuel tank 11 is disposed between the revolving frame 6 and the operator's seat platform 16, brought closer to the left surface part 25 side of the cab 22. Moreover, the level gauge 29 is provided on the outer surface of the fuel tank 11. Furthermore, the fuel filling opening 27 surrounding the fuel filling port 11J of the fuel tank 11 and the level gauge opening 28 are provided on the left surface part 25 of the cab 22.

As a result, even in the small-sized hydraulic excavator 1 in which the space on the revolving frame 6 is small and the operator's seat 18 is disposed on the upper side of the fuel tank 11 through the operator's seat platform 16, the level gauge 29 of the fuel tank 11 can be visually checked through the level gauge opening 28 of the cab 22. As a result, even if the fuel tank 11 is disposed in the small space on the revolving frame 6, the oil amount in this fuel tank 11 can be easily checked by the level gauge 29 from the outside of the cab 22.

Moreover, the level gauge holder 30 for holding the level gauge 29 is provided on the rear end part 16C1 of the left plate 16C constituting the operator's seat platform 16. As a result, the level gauge 29 is held at the position corresponding to the level gauge opening 28 of the cab 22 at all times. Therefore, even if the fuel tank 11 is disposed at a location away from the left surface part 25 of the cab 22, the level gauge 29 is visually checked from the outside of the cab 22 through the level gauge opening 28.

Furthermore, the level gauge 29 is formed by using a transparent plastic tube having oil resistance, for example, and thus, the shape can be freely changed between the top end part 29A and the lower end part 29B. Therefore, even if a shift is caused in a positional relationship between the level gauge opening 28 provided in the cab 22 and the level gauge 29 provided in the fuel tank 11, the level gauge 29 is held by the level gauge holder 30 at a position in the vicinity of the level gauge opening 28.

Moreover, the level gauge opening 28 is provided in the left surface part 25 of the cab 22 in the state juxtaposed with the fuel filling opening 27 in the front-and-rear direction. Therefore, when the fuel filling work into the fuel tank 11 disposed in the fuel filling opening 27 is performed, the worker can visually check the level gauge 29 of the fuel tank 11 through the level gauge opening 28 at all times. As a result, the fuel filling work can be performed while the fuel level in the fuel tank 11 is checked, and workability of the fuel filling work can be improved.

Furthermore, the scattering preventing cover 31 is provided between the fuel filling opening 27 of the cab 22 and the fuel filling port 11J of the fuel tank 11. Thus, even if the fuel is spilled from the fuel filling port 11J during the fuel filling to the fuel tank 11, the spilled fuel can be shielded from the inside of the cab 22 by the scattering preventing cover 31. As a result, the adhesion of the spilled fuel to the engine 7 whose temperature has become high or scattering of the same into the cab 22 and causing an odor can be suppressed, and the work environment can be kept favorable.

In the embodiment, the case where the fuel tank 11 is disposed, brought closer to the left surface part 25 of the cab 22, and the fuel filling opening 27 and the level gauge opening 28 are formed on the left surface part 25, respectively, is exemplified. However, the present invention is not limited to that, and it may be so constituted that the fuel tank 11 is disposed, brought closer to the right surface part of the cab 22, and the fuel filling opening and the level gauge opening are formed on the right surface part, respectively, for example.

Moreover, in the embodiment, the case where the level gauge opening 28 is disposed by being juxtaposed on the front side of the fuel filling opening 27 is exemplified. However, the present invention is not limited to that, and the level gauge opening 28 may be disposed by being juxtaposed on the rear side of the fuel filling opening 27.

Furthermore, in the embodiment, the small-sized hydraulic excavator 1 including the crawler-type lower traveling structure 2 is described as an example, but the present invention is not limited to that and may be applied to a small-sized hydraulic excavator including a wheel-type lower traveling structure, for example.

DESCRIPTION OF REFERENCE NUMERALS

1: Small-sized hydraulic excavator (Small-sized construction machine)
2: Lower traveling structure
4: Upper revolving structure
5: Working mechanism
6: Revolving frame
7: Engine (Prime mover)
11: Fuel tank
11J: Fuel filling port
16: Operator's seat platform
18: Operator's seat
22: Cab
25: Left surface part (Outer surface)
27: Fuel filling opening
28: Level gauge opening
29: Level gauge 30: Level gauge holder
31: Scattering preventing cover

The invention claimed is:

1. A small-sized construction machine comprising:
a self-propelled lower traveling structure,
an upper revolving structure rotatably mounted on said lower traveling structure, and
a working mechanism provided on a front part side of said upper revolving structure, wherein
said upper revolving structure including:
a revolving frame forming a support structural body,
a prime mover mounted on said revolving frame,
a fuel tank having a fuel filling port on an outer surface of the fuel tank, said fuel filling port supplying a fuel and the fuel tank storing the fuel to be supplied to said prime mover,
an operator's seat platform provided on said revolving frame by covering an upper side of said fuel tank and on which an operator's seat is mounted, and
a cab made of a box body covering a periphery of said operator's seat mounted on said operator's seat platform, characterized in that:
said fuel tank is disposed between said revolving frame and said operator's seat platform;
a level gauge which is formed by a transparent tubular body having flexibility and which displays a liquid level in said fuel tank is provided on the outer surface of said fuel tank;
said level gauge is extended in an up-and-down direction while being bent having an L-shape toward a lower end part from a top end part;
a fuel filling opening surrounding said fuel filling port of said fuel tank is provided on the outer surface of said cab and a level gauge opening for visually checking said level gauge from outside of said cab is provided;
a level gauge holder for holding said level gauge at a position corresponding to said level gauge opening is provided on said operator's seat platform;
said level gauge holder has an upper holder and a lower holder disposed on upper and lower parts at an interval; and
a middle portion of said level gauge is held in a state extended linearly in the up-and-down direction between the upper holder and the lower holder.

2. The small-sized construction machine according to claim 1, wherein
said level gauge opening is provided by being juxtaposed with said fuel filling opening in a front-and-rear direction.

3. The small-sized construction machine according to claim 1, wherein
a scattering preventing cover for preventing the supplied fuel from scattering to the periphery is provided between said fuel filling opening of said cab and said fuel filling port of said fuel tank.

* * * * *